United States Patent
Ren et al.

(10) Patent No.: US 9,009,834 B1
(45) Date of Patent: Apr. 14, 2015

(54) SYSTEM POLICY VIOLATION DETECTION

(75) Inventors: Jie Ren, Santa Monica, CA (US); Niels Provos, Mountain View, CA (US); Sean Harvey, Astoria, NY (US); Oliver G. Fisher, Ottawa (CA); Navdeep S. Jagpal, Montreal (CA); Qi Sun, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 678 days.

(21) Appl. No.: 12/566,439

(22) Filed: Sep. 24, 2009

(51) Int. Cl.
G06F 21/00 (2013.01)
G06F 21/10 (2013.01)
G06F 21/56 (2013.01)
H04L 29/06 (2006.01)

(52) U.S. Cl.
CPC ........... *G06F 21/10* (2013.01); *G06F 21/56* (2013.01); *G06F 21/566* (2013.01); *H04L 63/145* (2013.01)

(58) Field of Classification Search
CPC ....... G06F 21/56; G06F 21/566; G06F 21/10; H04L 63/145
USPC .............................. 726/24; 713/182; 709/224
See application file for complete search history.

(56) References Cited

U.S. PATENT DOCUMENTS

| | | | | |
|---|---|---|---|---|
| 6,701,363 | B1 * | 3/2004 | Chiu et al. | 709/224 |
| 7,043,555 | B1 * | 5/2006 | McClain et al. | 709/229 |
| 7,822,631 | B1 * | 10/2010 | Vander Mey et al. | 705/7.29 |
| 2002/0062361 | A1 * | 5/2002 | Kivipuro et al. | 709/219 |
| 2005/0060643 | A1 * | 3/2005 | Glass et al. | 715/501.1 |
| 2005/0071432 | A1 * | 3/2005 | Royston, III | 709/206 |
| 2006/0020814 | A1 * | 1/2006 | Lieblich et al. | 713/182 |
| 2006/0031318 | A1 * | 2/2006 | Gellens | 709/206 |
| 2006/0253584 | A1 * | 11/2006 | Dixon et al. | 709/225 |
| 2007/0133034 | A1 * | 6/2007 | Jindal et al. | 358/1.14 |

OTHER PUBLICATIONS

Polychronakis, Michalis, et al., "Ghost turns Zombie: Exploring the Life Cycle of Web-based Malware," Proceedings of the 1st USENIX Workshop on Large-Scale Exploits and Emergent Threats (LEET), 2008, 8 pages.
Provos, Niels et al., "All Your iFRAMEs Point to Us," 17th USENIX Security Symposium, 2008, pp. 1-15.
Provos, Niels, et al., "The Ghost in the Browser: Analysis of Web-based Malware," First Workshop on Hot Topics in Understanding Botnets (HotBots '07), 2007, 9 pages.

* cited by examiner

*Primary Examiner* — Syed Zaidi
(74) *Attorney, Agent, or Firm* — Fish & Richardson P.C.

(57) ABSTRACT

In a computer-implemented method, a digital content item to be tested is received. A display of a visual representation of the digital content item is simulated, where the visual representation is selectable and the digital content item is associated with a code snippet that is executed when the visual representation is selected. A simulated user click on the visual representation is received and the code snippet is executed in response. Processing actions of the code snippet are monitored, and it is determined whether the processing actions violate one or more predetermined system policies indicative of a content item unsuitable for service. A score for the code snippet is calculated based on one or more violations of the one or more predetermined system policies. The digital content item is suspended to prevent service of the digital content item if the score exceeds a predetermined threshold score, and validated for service otherwise.

18 Claims, 5 Drawing Sheets

SYSTEM POLICY VIOLATION DETECTION

TECHNICAL FIELD

This disclosure generally relates to testing and evaluating digital content.

BACKGROUND

A global increase in the number of users accessing the Internet has permitted advertisers to promote their goods and services to an increased number of consumer targets. Compared with traditional media such as television, newspapers, radio, and magazines, the Internet provides advertisers a relatively inexpensive means to reach large groups of consumers in a targeted manner. In addition, the Internet provides easy access to a wide number of users. This low cost and ease of access can allow a number of advertisers to provide advertising content via direct access and third party vendors. Third party vendors can be used to introduce a greater variety of advertising content into an advertising network by increasing an inventory of advertisements available for presentation on publisher sites.

In general, digital content providers may present advertisements to users to supplement, for example, digital content requested by the users. The digital content providers may receive financial benefits from advertisers for presenting their advertisements to users. However, certain advertisements or other types of digital content may be designed to induce an undesirable effect at the user's machine. It may be beneficial to detect advertisements or other types of digital content designed to induce an undesirable effect at the user's machine before the undesirable effect is substantiated at the user's machine, or before the advertisement or digital content is presented or served to the user's machine.

SUMMARY

This disclosure describes methods, systems, and devices that can be used to audit and test digital content.

In a first general aspect, a computer-implemented method of testing a digital content item for policy violations in a computer system test environment includes receiving, in a first computer system, a digital content item to be tested, the digital content item being available for presentation by the first computer system and hosted by a second computer system different from the first computer system. The method also includes simulating, in the first computer system, display of a visual representation of the digital content item, wherein the visual representation is selectable by a user and wherein the digital content item is associated with a code snippet that is executed when the visual representation of the digital content item is selected. The method further includes receiving in the first computer system a simulated user click on the visual representation of the digital content item and executing the code snippet in response to the received click, and monitoring in the first computer system processing actions of the code snippet and determining whether the processing actions violate one or more predetermined system policies indicative of a content item unsuitable for service, and calculating a score for the code snippet based on one or more violations of the one or more predetermined system policies. The method further includes suspending the digital content item to prevent service of the digital content item if the calculated score exceeds a predetermined threshold score, and validating the digital content item for service to users if the calculated score does not exceed the predetermined threshold score.

Implementations can include one or more of the following. The code snippet may not be executed until the digital content item is clicked on. The digital content item may be an advertisement. The monitoring may include determining whether execution of the code snippet causes content to be requested from a third computer system different from each of the first and second computer systems, or may include determining whether a file system configuration of the first computer system is changed. Determining whether execution of the code snippet causes content to be requested from a third computer system may include detecting an external download from a server through the second computer system. The monitoring may include determining whether an application is launched on the first computer system, or may include determining whether a payload received at the first computer system includes a virus. The simulating, in the first computer system, display of a visual representation of the digital content item may include displaying the visual representation on a display device of the first computer system.

In a second general aspect, a computer-implemented method of testing a digital content item for policy violations in a computer system test environment includes identifying, in a first computer system, a digital content item to be tested, the digital content item being available for presentation by the first computer system and hosted by a second computer system different from the first computer system, and simulating, in the first computer system, display of a visual representation of the digital content item, wherein the visual representation is selectable by a user and wherein the digital content item is associated with a code snippet that is executed when the visual representation of the digital content item is selected. The method also includes means for receiving in the first computer system a simulated user click on the visual representation of the digital content item and executing the code snippet in response to the received click, and means for monitoring in the first computer system processing actions of the code snippet and determining whether the processing actions violate one or more predetermined system policies indicative of a content item unsuitable for service. The method further includes calculating a score for the code snippet based on one or more violations of the one or more predetermined system policies, and suspending the digital content item to prevent service of the digital content item if the calculated score exceeds a predetermined threshold score, and validating the digital content item for service to users if the calculated score does not exceed the predetermined threshold score.

In a third general aspect, a system for testing a digital content item for policy violations includes an interface module configured to receive in a first computer system a digital content item to be tested, the digital content item being available for presentation by the computer system and hosted by a second computer system different from the first computer system. The system also includes an interaction module configured to: a) simulate, in the first computer system, display of a visual representation of the digital content item, wherein the visual representation is selectable by a user and wherein the digital content item is associated with a code snippet that is executed when the visual representation of the digital content item is selected, and b) receive at the first computer system a simulated user click on the visual representation of the digital content item and execute the code snippet in response to the received click. The system further includes a testing module configured to monitor in the first computer system processing actions of the code snippet and determine whether the processing actions violate one or more predetermined system policies indicative of a content item unsuitable for service, and calculate a score for the code snippet based on one or more violations of the one or more predetermined system policies, and a validation module configured to suspend the digital content item to prevent service of the digital content item if the calculated score exceeds a predetermined threshold score, and validate the digital content item for service to users if the calculated score does not exceed the threshold score.

Implementations can include one or more of the following. The code snippet may not be executed until the digital content item is clicked on. The digital content item may be an advertisement. The monitoring may include determining whether execution of the code snippet causes content to be requested from a third computer system different from each of the first and second computer systems. Determining whether execution of the code snippet causes content to be requested from a third computer system may include detecting an external download from a server through the second computer system. The monitoring may include determining whether a file system configuration of the first computer system is changed, determining whether an application is launched on the first computer system, or determining whether a payload received at the first computer system includes a virus.

The details of one or more implementations are set forth in the accompanying drawings and the description below. Other features and advantages will be apparent from the description and drawings, as well as from the claims.

DESCRIPTION

Figure 1:
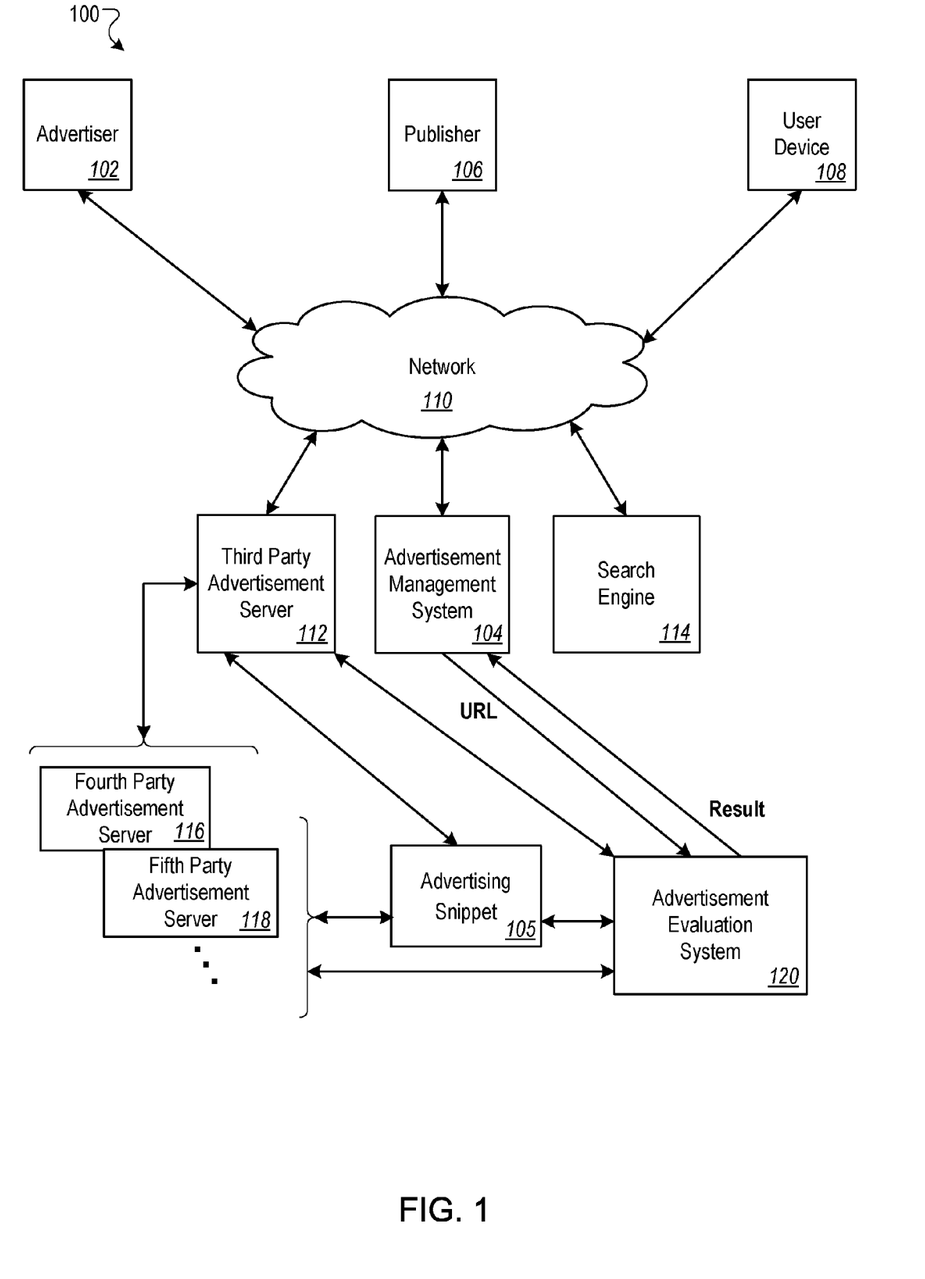
FIG. 1 is a block diagram of an example online environment.

Referring to FIG. 1, an example online advertising environment 100 can be used to test digital content, such as advertising content, to detect whether the content may harm a user's computer or may violate one or more predetermined system policies. In some implementations, the environment 100 can perform testing to determine whether displaying, executing, selecting, clicking-on, or otherwise interacting with the digital content or a visual representation of the digital content causes a violation of a predetermined system policy. Examples of system policy violations will be discussed in detail below, and can include download or execution of malicious software, but can also include download or execution of software that is not malicious or harmful in a traditional sense. As used herein, the term "malware" can refer to digital content that may be harmful, or to digital content that may not be harmful but which may otherwise violate a predetermined system policy or policies.

In various implementations, the testing may be performed prior to actual service of the digital content to users. Such testing of digital content may be considered a prescreening process for the digital content, where potentially harmful content may be identified in a controlled environment so that service of dangerous, risky, infected, suspicious, harmful, or policy-violating digital content to users may be avoided. Such content may be suspended, quarantined or flagged to prevent service of the content to users. The testing may be performed in a computer system that represents a "virtual machine," where the computer system appears to the rest of the environment like a typical user system to which digital content might be delivered, but which is equipped with modules and routines for testing and identifying policy-violating digital content before the digital content is inadvertently served to users. If testing of the digital content reveals that the digital content does not violate predetermined system policies or violates a tolerable number or subset of policies, the digital content may be validated and made available for service to users. Severity of policy violations may be considered in the evaluation of the digital content.

In some implementations, digital content can be re-tested as part of an auditing phase after the content has been validated. If digital content is found to violate system policies during an auditing test phase, the digital content can be suspended, quarantined or flagged even if the digital content had previously been validated. Previously approved content may be subsequently tested or sampled based on a type of data in the digital content, a number of requests for the digital content, or a source of the digital content, to list just a few examples. The digital content managed and delivered in the environment 100 may be, for example, advertising content or other forms of sponsored content.

Malware may include any type of computer contaminant, such as dishonest adware, computer viruses, spyware, Trojan horses, computer worms, browser exploits, or other malicious, unelected, unwanted, and/or obfuscated software. In various implementations, malware can include any suspicious software installation that occurs automatically upon receiving digital content, or code that causes unexpected changes to a system's configuration file system or registry. In some cases, the malware may be designed for propagation, data exfiltration, or remote control. The software, however, need not take malicious action to be considered malware; any software that is intrusively installed or executed, or violates one or more policy considerations as discussed herein can be considered malware, regardless of whether the actions taken by the software are malicious. Examples of software that may violate a policy but which may not directly harm a user's computer can include various types of monitoring software and start page hijacks, installations exceeding a predetermined size, or content received from a site known to have distributed harmful content previously (even if the presently received content is not harmful), and these and others can be considered malware. In various implementations, the techniques disclosed herein can be used to detect any of the above-mentioned types of digital content.

With reference to FIG. 1, the example online environment 100 distributes digital content in the form of advertising content and includes one or more advertisers 102, an advertisement management system 104, one or more publishers 106, a third party advertisement server 112, a search engine 114, an advertisement evaluation system 120, and one or more user access devices 108. All of these entities may be coupled to a network 110. Each of the elements 102-114 and 120 in FIG. 1 may be implemented or associated with hardware components, software components, firmware components, or any combination of such components. The elements 102-114 and 120 can, for example, be implemented or associated with general purpose servers, software processes and engines, and/or various embedded systems. The elements 102, 106, 110, and 112 may serve, for example, as a content distribution network. While reference is made to distributing advertisements, the environment 100 can be suitable for distributing other forms of digital content including promotional material, search results, images or video, weblogs, other forms of sponsored content, publisher pages, and the like. The various components of FIG. 1 will be described in more detail below.

The advertisement evaluation system (AES) 120 is used as described above to test digital content items, including ads, and can determine whether the items violate one or more predetermined system policies. As indicated by the arrow labeled "URL" in FIG. 1, the advertisement management system (AMS) 104 provides a digital content item or a link (e.g., a URL) to the item to the AES 120, and the AES 120 tests the item and sends a result back to the AMS 104 (see arrow labeled "Result").

The AES 120 can also communicate with the third-party ad server 112 in various implementations. While these various communications paths are shown for simplicity as being direct connections in FIG. 1, the information may be passed through network 110 in various implementations.

In general, the AMS 104 manages service and delivery of ads to users 108. The AMS operates on behalf of a content provider that provides digital content to user devices 108 in response, for example, to user requests for digital content. Before authorizing that an ad may be served to a user device 108, however, the AMS 104 determines with a level of confidence that the ad will not harm the user's computing device 108. For example, the content provider may request detection of any ads associated with malware as discussed above so as to prevent service of such ads to user devices 108. Content providers typically prefer not to be associated in any way with malware.

In various implementations, the result returned from the AES 120 to the AMS 104 following testing of the digital content item may take various forms. In some cases, a binary result such as "problematic" (e.g., "0") or "clean" (e.g., "1") may be returned to indicate that the ad has either failed or passed the test, respectively. In other cases, a numerical score within a range may be returned. The numerical score may represent a number of policies that the ad violated during testing, for example, and the AMS 104 may compare the number to a predetermined threshold value to determine whether to validate or suspend the ad. In yet other cases, the numerical score may represent a degree of compliance, such as a score within a range of 1-10 or 1-100. Again, the AMS 104 may use the score to determine whether the ad may be appropriate for service to users, as by comparing the score to a target or threshold score. In some cases, the AES 120 may return indications of tests or subtests that the ad failed (or passed, or both) during testing, and the indications can optionally include a degree of severity for one or more of the respective tests. The results returned from the AES 120 to the AMS 104 can include descriptive codes in some implementations that can provide insight into the test results.

FIG. 1 shows an advertising code snippet 105 that may be provided from a third-party server 112 or a higher-party server (e.g., a fourth-party server 116 or a fifth-party server 118) to the AES 120. In some examples, AMS 104 may provide a code snippet 105 to the AES 120 as well. The advertising snippet 105 may represent executable code intended to be executed on the recipient device, such as a user device 108. In the testing environment, the code snippet 105 can be executed on a computing system of the AES 120. The AES 120 may test the snippet 105 for policy violations, and may provide results to the AMS 104. In some cases, the AES 120 may include the snippet 105 or reference to the snippet 105 with the results.

As will be discussed in greater detail below, a computer system within the AES 120 may display a visual representation of a digital promotional content item (e.g., an ad), where the visual representation is selectable or able to be "clicked-on" by a user, as by actively engaging a pointing device (e.g., a mouse) while a cursor or similar indicator is positioned over or proximate the representation. The visual representation may include text, an image, video, audio, or some combination of these, and may be associated with a rich media ad such as a flash ad. In some cases, a selection or click of the visual representation may cause code associated with the ad to be executed or may cause a browser redirection to a landing page associated with the ad. Because ads or code snippets may be received from third-party servers 112 or even from fourth-party servers 116 or fifth-party servers 118 via the third-party server 112, the AES 120 or AMS 104 may not have advance knowledge of the trustworthiness of the ad, or of operations that may be performed upon selection or click of the ad. This may be in contrast with ads directly managed by the AMS 104 or by another entity under the direction of the AMS 104, for example, where the AMS 104 and/or AES 120 may have direct access to advertisement landing page URLs and may verify that the landing pages are appropriate for service to users 108.

The system provides testing capability that includes monitoring actions that occur in response to an active user interaction with a visual representation of an ad, such as selecting or clicking-on the representation, so as to provide enhanced testing coverage. For example, actions that may occur in response to a selection or click of the ad but which may not occur on mere presentation or display of the ad can be monitored. In some cases, a code snippet may be executed upon selection or click of the ad. The code snippet may not be executed at the time the ad is displayed, and may not be executed until the ad is selected or clicked-on. In these cases, a test that merely observes actions associated with delivery or presentation of the ad, without considering actions associated with selection or click of the ad, may not detect various occurrences of system policy infractions.

In the depicted implementation, the computer network 110 connects the advertisers 102, the advertisement management system 104, the publishers 106, the user devices 108, and one or more third party advertisement servers 112. The network 110 may be a local area network (LAN), a wide area network (WAN), the Internet, or a combination thereof.

The one or more advertisers 102 may include any entities that are associated with advertisements ("ads"). The ads may be in the form of graphical ads, such as banner ads, text-only ads, image ads, or rich-media ads such as flash ads, including ads with an audio or video component, or ads that combine two of more of the above formats. The ads may also include embedded information, such as links, meta-information, and/or machine-executable instructions. The ads can include embedded links to landing pages, where the links may direct a user to a landing page on the advertiser's website when the user selects (e.g., clicks-on) the ad, which may be presented on, for example, a publisher website.

The advertisers 102 can provide products and/or services related to ads, or can produce ads associated with products or services produced by another entity. The advertisers 102 can include or be associated with, for example, retailers, wholesalers, warehouses, manufacturers, distributors, health care providers, educational establishments, financial establishments, technology providers, energy providers, utility providers, or any other product or service providers or distributors.

In various implementations, the advertisers 102 may directly or indirectly generate, maintain, and/or track ads. For example, the advertisers 102 can directly or indirectly enter, maintain, verify, and track ad information in the advertising management system 104. The advertisers 102 may include or maintain one or more data processing systems, such as servers or embedded systems, coupled to the network 110. The advertisers 102 may include or maintain one or more processes that run on one or more data processing systems for creating, managing, or tracking ads.

The publishers 106 may include any entities that generate, maintain, provide, present and/or otherwise process content in the environment 100. The publisher "content" can include various types of web-based and/or otherwise-presented information, such as articles, discussion threads, reports, analyses, financial statements, music, video, graphics, search results, web page listings, information feeds (e.g., RSS feeds), television broadcasts, radio broadcasts, printed publications, and the like.

One example of a publisher 106 is a general content server that receives requests for content (e.g., articles, discussion threads, music, video, graphics, search results, web page listings, information feeds), from a user device 108 and retrieves the requested content in response to the request. The publisher 106 can provide the content to the requesting user device 108.

As described above, one example of content that can be included in service to a user device 108 is an advertising snippet 105. The advertising snippet may include instructions or code that when executed or interpreted at the user device 108 causes the user device 108 to send a request for an advertisement to an advertisement server. For example, the user advertising snippet 105, when executed, may cause the device 108 to request an ad from a third party advertisement server 112. When the requested advertisement is received by the user device 108, the advertisement may be displayed to the user. Alternatively, content can be executed or interpreted by another device (e.g., the advertisement server or a proxy) prior to delivery of the advertisement to the user device 108.

A search service is another example of a publisher 106. A search service can receive queries for search results and retrieve relevant search results from an index of documents (e.g., from an index of web pages). Search results can include, for example, lists of web page titles, snippets of text extracted from those web pages, and hypertext links to those web pages. A search engine 114 can be associated with a search service, and can be used to search an index of documents and retrieve relevant search results.

In some implementations, the search engine 114 can cause advertising snippets 105 to be executed on a user device 108. For example, the search engine can submit a request for ads, and can receive corresponding advertising snippets 105 in response, perhaps in addition to or contemporaneously with a request for traditional search results. The search engine 114 can combine the search results with one or more of the advertising snippets 105, and the combined information can then be forwarded to the user device 108 that requested the content. The advertising snippets 105 may then be executed on the user device 108.

In some implementations, the publishers 106 may include content providers with an Internet presence, such as online publication and news providers (e.g., online newspapers, online magazines, or television websites), online service providers (e.g., financial service providers or health service providers), and the like. The publishers 106 can include television broadcasters, radio broadcasters, satellite broadcasters, and other content providers. One or more of the publishers 106 may represent a content network that is associated with the advertisement management system (AMS) 104.

The publishers 106 may receive requests from the user access devices 108 (or other elements in the environment 100) and may provide or present content to the requesting devices. The publishers 106 may provide or present content in various forms, including web-based and non-web-based forms. In some implementations, the publishers 106 may generate and/or maintain such content, or may retrieve the content from other network resources. A publisher may also receive ads or content from other publishers, and this information can be displayed on the publisher's site.

The publishers 106 may be configured to integrate or combine retrieved content with ads that are related to the retrieved content. The combination of the content and ads may be provided to the user devices 108 for display to users. As discussed further below, these relevant ads may be provided from the AMS 104, the third-party ad server 112, or higher-party ad servers 116, 118. In some examples, the publishers 106 may retrieve content for display on a particular user access device 108 and then forward the content to the user access device 108 along with code that causes one or more ads to be requested, received, and displayed to the user. In other examples, the publishers 106 may retrieve content, retrieve one or more relevant ads (e.g., from the AMS 104 or the advertisers 102), and then integrate the ads and the content to form a content page for display to the user. In some implementations, a digital content provider (not shown explicitly in FIG. 1) may include all or portions of the advertisement management system 104, the search engine 114, the advertisement evaluation system 120, and optionally one or more publishers 106, and may deliver digital content to user devices 108.

The AMS 104 can manage ads and provide various services to the advertisers 102, the publishers 106, and the user access devices 108. The AMS 104 may store ads in an ad repository and facilitate distribution or targeting of ads through the environment 100 to the user access devices 108.

In various implementations, the AMS 104 provides one or more advertising code snippets to the advertisement evaluation system (AES) 120 to determine whether the code snippets adhere to system policies. The AES 120 performs testing of the advertising code snippets and provides testing results to the AMS 104. The AMS 104 can then use the testing results to determine whether various ads may be appropriate for service to a user device 108. For example, if testing results indicate that a particular advertising code snippet 105 caused one or more system policy violations during testing of the snippet, the corresponding ad may be suspended to prevent distribution of the ad to a user device 108. In this fashion, questionable or risky code snippets may be identified in advance of actual service of the snippets to a user device, and ad distribution may be accordingly adjusted.

The user devices 108 and the advertisers 102 can provide usage information to the AMS 104, such as whether or not a conversion or click-through related to an ad has occurred, for example. This usage information can include measured or observed user behavior related to an advertisement provided in response to the execution of the advertising snippet 105. The AMS 104 can perform financial transactions, such as crediting the publishers 106 and charging the advertisers 102 based on the usage information. In some implementations, the advertisement management system 104 can also provide the advertising code snippets 105 to the publishers 106, or to the user devices 108 in response to requests from the user devices 108.

The third-party advertisement server 112 can provide third-party ad content to publishers and users. Although only one third-party advertisement server 112 is shown, there can be many third-party advertisement servers 112. In addition, environment 100 can include fourth-party advertisement servers 116, fifth-party advertisement servers 118, and other higher-order (e.g., $n^{th}$ degree) advertisement servers. The content provided by servers 112, 116, and 118 can be closely monitored by the AES 120 to ensure that advertisements provided from the servers 112, 116, and 118 conform to policy requirements of the AMS 104. This can provide an effective safeguard, because these servers 112, 116, and 118 may not be under the control of the AMS 104. Nevertheless, the AMS 104 may have an interest in assuring that only sponsored content that does not violate system policy considerations be served to user devices 108. The AES 120 can test ad content from these unaffiliated advertisement providers in a controlled environment and provide testing results that indicate whether a particular ad or code snippet is likely to be harmful or risky.

The fourth-party advertisement servers 116 and the fifth-party advertisement servers 118 can include or have access to advertisers that provide content via the third-party advertisement server 112. For example, servers 116 and 118 may provide advertisements from one or more companies that have not been quality assured and/or approved for certification by the AMS 104. The advertisements provided by servers 116 and 118 may be received from an external call or creative redirection made to a server or company beyond, for example, a certified third-party advertisement server (e.g., server 112). In general, the fourth-party advertisement servers 116 and the fifth-party advertisement servers 118 may provide ads or creative redirections that include RSS feeds, XML feeds, videos, images, and other content that is not hosted by a certified vendor or ad server. Since fourth- and fifth-party ad calls or creative redirects may result in page performance latency, page errors and/or reporting discrepancies, the system 100 can test and/or remove any ad content that is deemed to be in violation of system policies.

The AES 120 may detect policy violations during testing in a variety of ways. In some implementations, the AES 120 can utilize a machine learning engine (not shown) associated with the AES 120 that has been "taught" to recognize policy violations from a training set of advertisement snippets 105. A control evaluation can be used in a training phase. The control evaluation can include a human evaluation of the advertisement snippets 105. For example, the human review of the advertisement snippet 105 may include an examination of features of the advertisement snippet 105. The review may also provide an overall rating of the likelihood that the advertisement snippet 105 will violate a policy. The rating can include descriptions or codes descriptive of aspects of the snippet or testing of the snippet, such as high latency, low latency, large file size, small file size, extremely malware infected, semi-malware infected, caused file system changes, launched an application, ordered infected payload, installed an application, and the like.

In other implementations, policy violation detection techniques that do not include machine learning are used. For example, the AES 120 may include one or more detection modules that monitor for system changes (e.g., file system changes, changes to the registry) following a selection or active interaction with an ad or a visual representation of the ad. Similarly, the one or more modules may monitor received payloads and test the payloads using a virus scanner. One or more modules may also monitor for content received from a fourth-party server 116, as via a sanctioned third-party server 112. In some cases, a rule that calls for flagging any content received from a fourth-party server 116 (or higher-order server) can be used, and the associated advertisement can be disqualified or scored to indicate a heightened risk. Such a rule may be appropriate, for example, because the content provider may have no basis for believing that content from any fourth-party server 116 is trustworthy, as the fourth-party server may be outside a group of approved providers from the standpoint of the content provider.

In various implementations, the AES 120 can be used to test code snippets 105 that cause one or more ads to be requested when executed. Also, the AES 120 can test individual advertisements, regardless of whether the advertisements are associated with code snippets. Scores or rankings can be computed or assigned to code snippets, advertisements, or both. In some cases, scores can be determined for advertisement providers or hosts, as by testing a selection of content available from the provider and determining a representative score for the provider. In general, content serving decisions can use test results or scores provided by the AES 120 to decide whether content is appropriate for service to a user device 108.

In some cases, content may be appropriate for service to one type of device but may be inappropriate for service to another type of device 108. That is, the AES 120 or AMS 104 may consider features or characteristics of a particular user device 108 in determining whether a given content piece is appropriate for service to the device. Similarly, configuration options of a particular device may be used in content service decision-making.

Policy violations can be defined in various ways. For example, a redirect chain can include a series of redirected operations that occur in response to an execution of the advertising snippet 105. The AES 120 may permit a predetermined number of redirected operations for a single snippet 105, and may flag the snippet if more than the predetermined number of redirects occur. Likewise, a file size of an advertisement received or execution latency of the advertising snippet 105 can be monitored and compared to predetermined size or latency parameters. In some implementations, a single policy violation may not trigger suspension of the advertisement code snippet 105; in other implementations, a single violation may be enough to cause the ad to be suspended. In some cases, the AES 120 can aggregate violations to determine if the advertising snippet 105 should be suspended. As described above, in some implementations a final determination regarding validation or non-validation of an ad or a code snippet can be made by the AMS 104; in other implementations, the AES 120 can make the final decision and present the decision as a result to the AMS 104.

In some implementations, the AES 120 may have the flexibility to suspend groups of content, such as all or some portion of the content associated with the advertising code snippet 105 in an ad group or ad campaign, or all or some portion of the advertising snippet content associated with a common host server. For example, the AES 120 may determine that only a subset of an advertiser's advertising snippets cause malware to be downloaded when executed, and may thus suspend only those advertising snippets. As another example, the AES 120 may determine that only a subset of advertisement requests from the advertising code snippets to a third-party advertisement server cause malware to be delivered.

In general, an ad may refer to any form of communication in which one or more products, services, ideas, messages, people, organizations, or other items are identified and promoted or otherwise communicated. Ads are not limited to commercial promotions or other communications. An ad may be a public service announcement or any other type of notice, such as a broadcast or a public notice published in printed or electronic press. In some implementations, an ad may be referred to or included in sponsored content.

Ads (or promotional or digital content items generally) may be communicated via various media and in a number of forms. In some examples, ads may be communicated through an interactive medium, such as the Internet, and may include graphical ads (e.g., banner ads), textual ads, image ads, audio ads, video ads, ads combining one of more of the foregoing formats, or any form of electronically delivered advertisement. Ads may include embedded information, such as embedded media, links, meta-information, and/or machine executable instructions. Ads also may be communicated through RSS (Really Simple Syndication) feeds, radio channels, television channels, print media, and other media. Ads can be associated with code snippets that execute on a machine to request delivery of an advertisement or to perform actions associated with the advertisement.

The term "ad" can refer to both a single "creative" and an "ad group." A creative can refer to any entity that represents one ad impression. An ad impression can refer to any form of presentation of an ad, such that the ad is viewable or receivable by a user. In some examples, an ad impression may occur when an ad is displayed on a display device of a user access device. An ad group can refer, for example, to an entity that represents a group of creatives that share a common characteristic, such as having the same ad targeting criteria. Ad groups can be used to create an ad campaign.

In some examples, ads can be embedded within other content. For example, ads can be displayed with other content (e.g., newspaper articles, weblogs, or search queries) in a web page associated with a publisher. When displayed, the ads can occupy an ad space or "block" of the web page. An ad space can refer to any element that allows information to be rendered. In some examples, the ad space may be implemented as an HTML element, such an I-Frame (inline frame) or other type of embeddable display element. The ad space can include any portion (which can include all) of a user display. The ad space can be a discrete, isolated portion of a display or the ad space can be blended and dispersed throughout a display. The ad space can be a discrete element or dispersed in multiple sub-elements. For example, ads or representations of ads displayed with search results may be displayed isolated from the actual search results. A content queue can be associated with an ad space.

Figure 2:
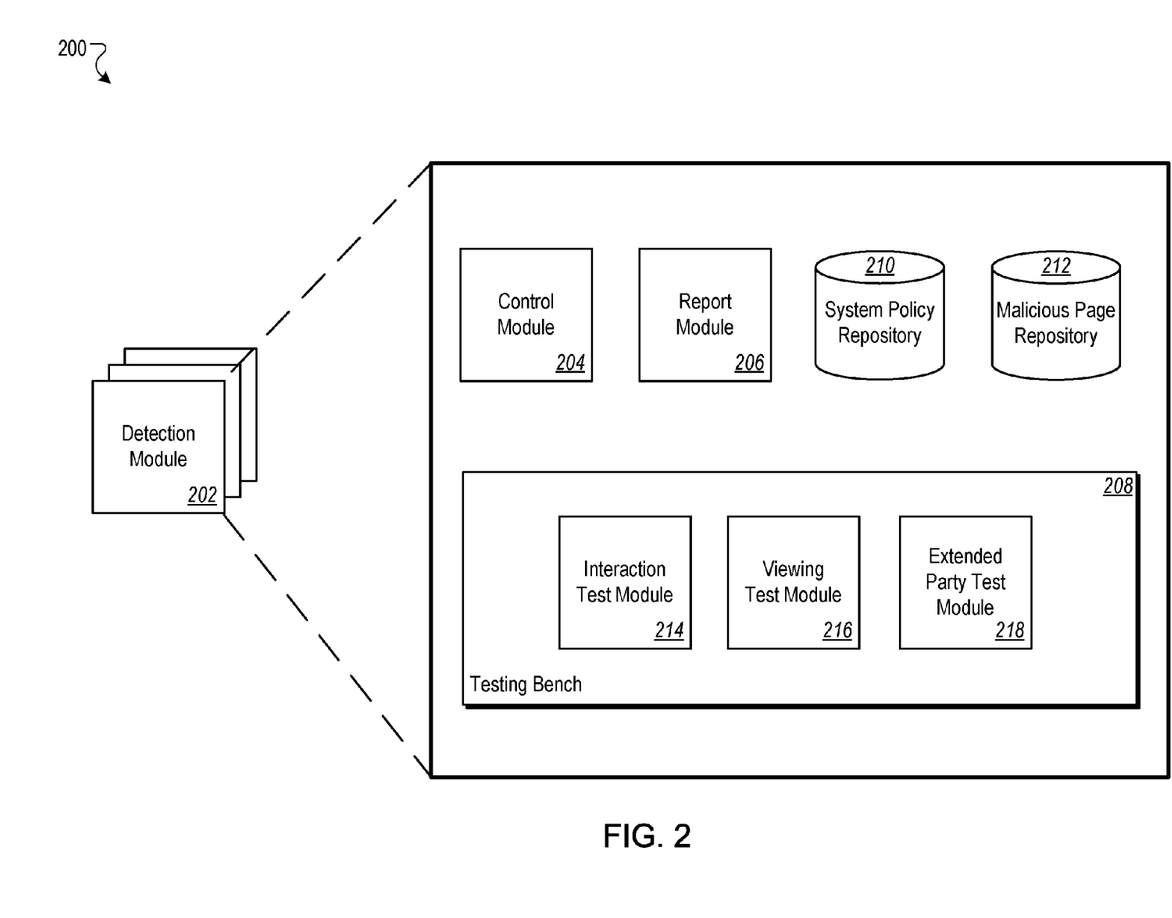
FIG. 2 is a block diagram of an example policy violation detection system.

FIG. 2 is a block diagram of an example policy violation detection system 200. The system 200 can include one or more detection modules 202. The system 200 represents an example configuration of one or more systems maintained by an online environment. For example, the system 200 can be implemented on one or more computing systems within online environment 100 in the AMS 104 or the AES 120. In some implementations, portions of the detection system 200 can be implemented in the AES 120, and portions can be implemented in the AMS 104. In general, the system 200 can perform testing on advertising content, such as advertisements, code snippets associated with requesting ads, or code snippets that execute when an ad is selected or clicked, to detect whether the content violates system-implemented policies. In some implementations, AES 120 uses a detection module 202 to implement a virtual machine, which may provide an environment similar to a typical user device to simulate a user viewing and interacting with a particular advertisement or code snippet. The virtual machine is not shown in FIG. 2, but may include an instantiation of one or more components of the detection module, such as testing bench 208 and control module 204, for example.

As described above, policy violations can vary in type and in level of importance or severity. System policies may be predefined according to some implementations, as may actions, characteristics, traits, features, or defects that constitute violations of those policies. For example, the system 200 may define a maximum ad content size. If the size of a received advertisement exceeds a predetermined size threshold, the AES 120 can detect a "size" policy violation and associate the violation with the oversized ad. Similarly, the system 200 may define a maximum time period requirement for downloading or executing ad content. If a received ad takes too long to download and/or execute, the AES 120 can detect a "latency" policy violation for the offending ad content. Some or all content received at the detection module 202 may be tested for viruses or other harmful characteristics and, if such characteristics are found, the system 200 can detect a "virus" policy violation. If unexpected changes to a system control memory location (e.g., the system registry or other protected memory locations) occur, the system 200 can detect a "registry" policy violation. If an unexpected launch of an application occurs, the system 200 can detect an "unauthorized launch" policy violation. If an unexpectedly large percentage of CPU bandwidth is requested or consumed, the system can detect an "overload" policy violation. If content is received at the virtual machine from a fourth-party server 116 (e.g., via an authorized third-party server 112), the system 200 can detect an "unauthorized host" policy violation.

As illustrated in FIG. 2, the system 200 includes one or more detection modules 202. A detection module 202 can implement a virtual machine and execute received advertising code snippets in a similar format to the way a user device 108 would execute the advertising code snippets. For example, the virtual machine can provide a web browser to present received web pages and receive input for interaction with presented content. In this fashion, a user experience may be simulated in a controlled environment to test and identify policy-violating digital content of interest without subjecting an actual user to risks associated with the content.

The detection module 202, or a virtual machine implemented by the module, may include or generate physical or virtual mechanisms by which a user (or system) can input information to the AES 120 or other system, and/or by which a user (or system) can perceive information generated by such systems. In some examples, the detection modules 202 may include or generate visual interfaces, such as graphical user interfaces (GUIs). For example, the detection modules 202 can support a web browser application capable of simulating user interactions. The browser application can be used to display content and report back any possible issues related to viewing and/or interacting with the content. Other types of interfaces can also be used. The interfaces can include one or more physical or virtual elements or widgets that allow a user (or system) to view, select, and/or indicate information.

As illustrated in FIG. 2, the detection module 202 includes a control module 204, a report module 206, and a testing bench 208. The detection module 202 also includes a system policy repository 210 and a malicious page repository 212. The configuration of FIG. 2 is merely an example implementation, and the functionality of the control module 204, the report module 206, and the testing bench 208 can all be distributed or exist in additional or fewer modules than are illustrated in FIG. 2. In some implementations, the modules 204, 206, and 208 can be distributed among various serving systems or backend systems, such as the AMS 104.

The control module 204 generally controls functions performed by system 200. Example tasks for which control module 204 may be responsible can include determining which tests to perform on a particular advertising code snippet or ad, running tests in testing bench 208, displaying test results, storing test results, invoking virtual machines, simulating user inputs, comparing system-detected malware to known malware, suspending or validating content, managing initial test phases and subsequent auditing test phases, and other processing functions.

The report module 206 generates testing results pertaining to tested content, quality scores for ad content, or other system test results. The report module 206 can also send report statistics, quality scores, or other metrics to one or more parties in environment 100, for example.

The testing bench 208 includes an interaction test module 214, a viewing test module 216, and an extended party test module 218. The testing bench 208 can be used to test advertising code snippets 105 or associated advertisements, for example, by viewing and/or interacting with the advertising code snippet 105 or ad and determining if one or more policy violations occur. The system 200 can then take appropriate action when a policy violation is detected. Such actions may follow pre-determined guidelines, such as to suspend an advertiser's account or access by the third party advertisement server 112, and/or "flag" the advertising snippet or advertising code snippets 105 as violating one or more policies.

The detection module 202 can use the testing bench 208 to test for a variety of policy or security violations resulting from the processing of an advertising code snippet. For example, the advertising code snippet 105 may point to or initiate a single line of script (e.g., a first JavaScript) that, when executed, references a single line of HTML containing an iFrame. Suppose that retrieval of the iFrame causes installation of several malware binaries. If such a snippet were processed by a user device 108, the device 108 may receive the several malware binaries and they may be installed on the user device 108. Instead, before the code snippet is approved for distribution to actual users, the controlled testing environment of the AES 120 can use the testing bench 208 to simulate the user experience in a virtual machine, for example, detect the malware binaries, and flag the content as problematic to prevent distribution of the content to actual users.

In some implementations, the AES 120 can utilize a policy rule set stored in system policy repository 210 to test for policy violations resulting from the execution of an advertising code snippet. Rules may be determined by a system administrator in some implementations. As a representative example, the system administrator may determine that all banner format advertisements should be 468×60 pixels, less than 50 kilobytes, and a .jpeg, .png, or .gif image file. A rule that creatives be free of applications such as ActiveX, viruses, exit pops, spyware, or malware can be implemented. Restrictions on use of cookies can be implemented, and in some cases cookies can be prohibited. Any advertising that includes the name of the publisher 106 can be flagged for further review so that the publisher 106 can approve the advertising. Likewise, phrases such as "click here" or other content that could apply to any advertising snippet can be used to screen for potential policy violations. In some implementations, animation may be limited to a maximum of 15 seconds at a 15-20 frame-per-second frame rate. Other rules created by the system administrator can assist in monitoring editorial policy issues such as competitive claims, unconventional layouts, image footer bars, image quality, image relevance (e.g., keywords relating to the content), mimicking computer functions, mimicking text advertisements, offers for free or discounted items with no clear or accurate display of such an offer on the landing page, proper names for people-finder or similar services, incorrect spelling or symbols, superlatives without third-party verification, inaccurate or general keywords, or third-party trademark usage.

For animation advertisements, rules specifying staying inbounds of an allotted space or within ad unit boundaries, being within an allowed format size or initial load size, maintaining detailed specifications for Flash advertisements, offering prizes for clicks, strobing or flashing advertisements, and mimicking computer functions can be used. Policy violations regarding linked information can also be evaluated using rules for detecting affiliate advertisements for third parties, a disabling of a user's "back" icon, destination and display URL inaccuracies, and use of pop-ups.

The viewing test module 216 can simulate a user's viewing experience in perceiving advertising content. For example, the viewing test module 216 can simulate execution of the advertising code snippet 105 and display content associated therewith on a system. In some cases, the system 200 can test for policy violations associated with presentation or display of advertising content. In some implementations, the system 200 can further test for policy violations associated with active interaction (e.g., selecting or clicking with a pointing device) with the advertising content. By displaying the advertising code snippet 105 or associated content, the module 216 can detect whether the snippet 105 will cause a system error or problem. The system error or problem may pertain to a system-enforced policy violation, including those discussed above.

The interaction test module 214 can simulate a user interaction with an advertising code snippet or advertisement. For example, the interaction test module 214 can simulate a user's input action on a virtual machine and can simulate a user's input keystroke or selection, as by simulating a pointing device operation such as clicking a mouse, to execute an advertising code snippet or select an ad. In this fashion, the module 214 can provide a mechanism for automatically displaying and testing active interaction with the advertising code snippet or ad. In some implementations, a human can perform the actual interaction and the test module 214 can analyze the behavior of the processing actions in the same manner as if they system performed the "simulated testing."

The interaction test module 214 can monitor the behavior of the virtual machine as the user interactions or simulated user actions are performed, or as viewing or simulated viewing is tested as described above. For example, the interaction test module 214 can detect new processes invoked, file system changes, registry modifications and other system changes, and can monitor outgoing and incoming communications, including monitoring received data as a result of the interaction. The interaction test module 214 can detect abnormal processing activity in the monitored areas and use the activity to determine if the processing activity is indicative of one or more policy violations. In one example, the module 214 can detect whether a particular cookie is dropped (e.g., stored) in memory. In another example, the interaction testing module 214 can monitor processing actions of code snippets to detect whether new applications have been launched or are running, which can be a strong indication of malicious intent.

The extended party test module 218 can detect what may happen when a third, fourth, fifth, or "nth" party advertising code snippet is presented to a user. This may occur, for example, when the virtual machine follows a request that results in receipt of content originating from a fourth- or fifth-party server. The module 218 can determine whether a fourth or fifth party call has occurred by detecting the occurrence of an external download from a server or company via a 3rd party vendor, for example. The extended party test module 218 can detect various aspects about the source of a particular advertising party. For example, the extended party test module 218 can execute an advertising code snippet to determine where the snippet directs a user's machine. The further testing can generate an estimation of the quality of the $4^{th}$ or $5^{th}$ party source and/or the quality of the ad content.

In some implementations, the AES 120 can suspend an advertisement or digital content item because of one or more policy violations. The AES 120 may prevent service of the suspended advertisement or digital content item to users during the period of suspension. In some cases, if the ad or content item is later tested and found to be clean of policy violations, the AES may lift the suspension and service of the ad may begin or resume. The AES can similarly suspend advertisers' accounts if one or more ads or digital content items associated with the accounts produce policy violations. Such a suspension can be for a single or multiple policy violations on a single advertising snippet 105, or a single or multiple policy violations on different advertising snippets 105. The suspension and remediation can be handled in a manner similar to the suspension of an advertisement. In some implementations, the AES 120 can allow an advertiser to appeal a suspension or request a reevaluation, and content associated with the advertiser can be correspondingly reevaluated. If the reevaluation is positive, the advertiser's accounts may be unsuspended. Third-party ad servers can also be suspended if one or more accounts that use the third-party server are suspended or associated with one or more policy violations, and subsequent testing can be performed to reevaluate as described above.

Various forms of persistent storage may be provided, including fixed disk drives and/or solid state memory devices. The two examples shown in FIG. 2 include the system policy repository 210 and the malicious page repository 212. The system policy repository 210 includes data representing one or more system policies. The repository 210 may include conditions relating to various tests that can be performed on digital content, including standards by which to judge the test results. The repository 210 may include information regarding what constitutes a failed test or threshold conditions for validating content. Policies can relate to content size requirements (e.g., maximum file size for image or flash ad), latency requirements (e.g., time duration for completing request and receipt of content), and data content requirements (e.g., an ad or code snippet having changed content from approved content), to list just a few examples. System policies may include age-inappropriate considerations (or user considerations in general) for content, such as pornography or sexually explicit content. Policies can also include preventing distribution of content that advocates violence against an individual or group, advertises illegal activities or contraband, or "phishes," including fraudulent content devised to collect sensitive personal information. Similarly, policies may cover bulk advertising products, template sites for ad networks, automated ad clicking products or services, copyrighted content without permission, and falsified documents.

In some implementations, the rules or data in the system repository 210 may be used to test whether received content originated from a source too far removed from an approved source. That is, in some cases the system may approve certain content-providing entities, but those approved entities may receive and forward content from unapproved (from the system's viewpoint) entities. For example, with reference to FIG. 1, the third-party server 112 may be an approved content provider by the AMS 104, but the fourth-party server 116 may not be approved. In this example, if the third-party server 112 receives content from the fourth-party server 116 and passes that content to the AMS 104 or the AES 120, testing may detect the content as originating from a non-approved entity. This may constitute a policy violation in some implementations.

The malicious page repository 212 can include data representing links to known malware distribution sites, suspicious HTML elements, or URLs having the presence of code obfuscation. In some implementations, content can be compared to these examples so as to identify matches or similarities and flag or fail the content if the similarities are sufficient to indicate that service of the content would be unduly risky. The AES 120 can use data in the malicious page repository 212 as part of a comparison test to determine if ad content has been previously received and previously identified as malicious software, or whether received content is related to the known hazardous content.

Figure 3:
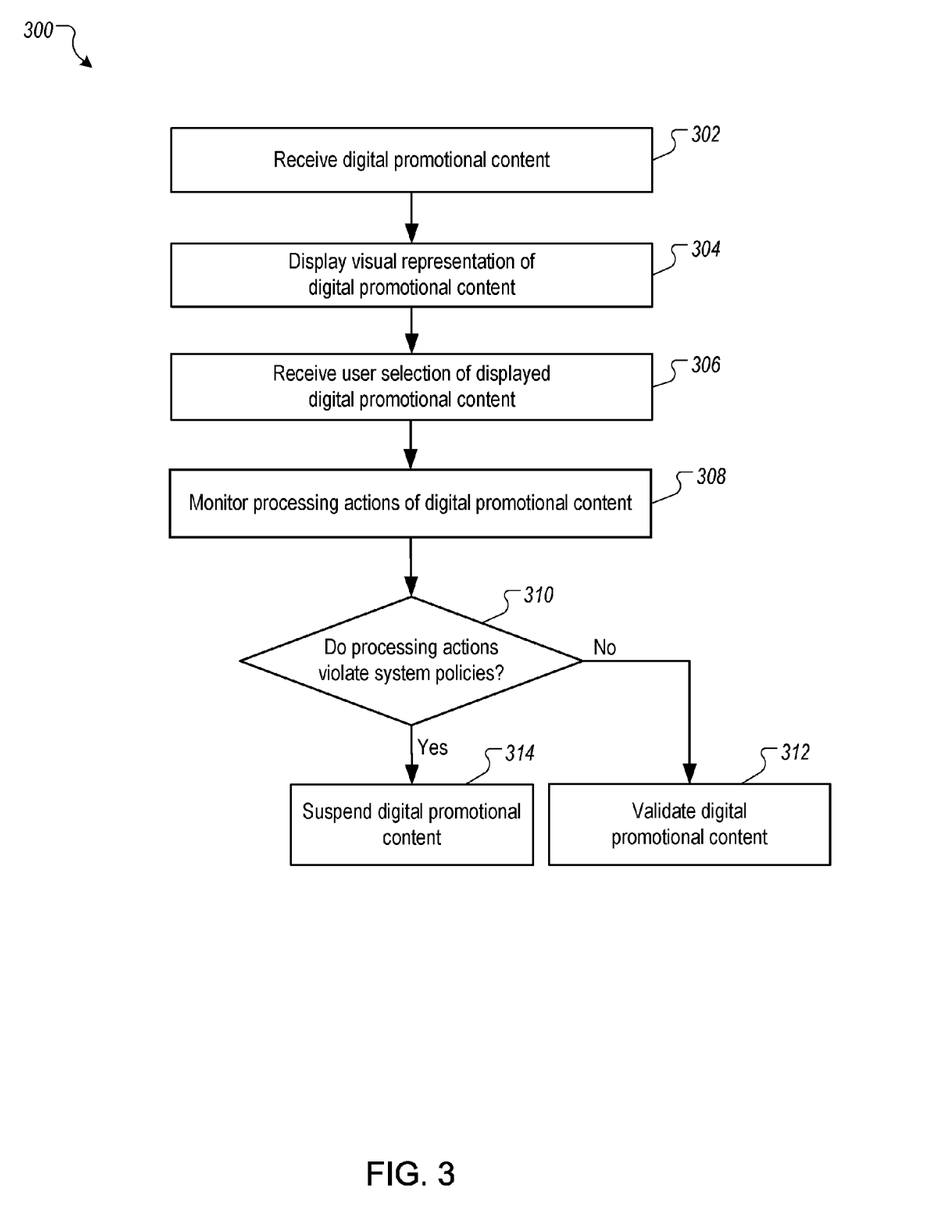
FIG. 3 is a flow diagram of an example process for testing digital content for policy violations.

FIG. 3 is a flow diagram of an example process 300 for testing digital content for policy violations. In various implementations, the digital content can include promotional content, such as electronic advertisements or code snippets associated with electronic advertisements, including snippets that when executed request advertisements or snippets that execute upon a selection or click on an advertisement. "Code snippet" can also refer to the advertisement, in some implementations. The process 300 may be implemented by executing, with a processor or processing system, software instructions stored in a computer-readable medium. The processor or processing system may be part of a computer system that includes one or more of the entities (e.g., the AES 120, the AMS 104, or both) shown in FIG. 1, for example. The process 300 may be used by a content provider, for example, to determine if digital promotional content is suitable for presentation, or if the digital content violates one or more system policies and may therefore be unsuitable for presentation. In various implementations, the code snippets identified by the process 300 may be tested by the AES 120, the AMS 104, or another system entity capable of testing digital content.

The process 300 begins with receipt of a digital promotional content item to be tested (302). For example, the AES 120 may receive an advertising code snippet 105, which may be served over the network 110. The advertising code snippet 105 may have associated therewith a digital content item that is displayed, presented, or otherwise rendered for viewing when the code snippet 105 is executed. In general, the advertising code snippet 105 can function to request one or several lines of text, images, or video clips when executed. The digital content item may be received in a first computer system, and may be available for presentation by the first computer system. The digital content item may be hosted, however, by a second computer system different from the first computer system. The first computer system may have not previously verified the digital content item, and in some cases may have limited or no information on the second computer system. The second computer system may likewise not be validated as an approved content provider by the first computer system in some implementations.

The process 300 displays a visual representation of the digital promotional content item on a display device (304). The display device may be included in the first computer system, and may be part of a testing system for testing digital content. The visual representation may be selectable by a user, such as a human user or an automated system process that can simulate a user selection or click of the representation. For example, the process 300 can receive a user (or system) selection or click of a displayed digital promotional content (306). The selection may be a non-passive interaction such as a mouse click, a mouse-over, a keyboard input, a scrolling input, a function call (by the system or a batch file), or other active engagement of the content item. In some implementations, the received selection can be automated by the environment 100.

The digital promotional content item may be associated with a code snippet that may be executed when the visual representation of the digital promotional content item is selected or clicked-on. In various implementations, the code snippet is executed by a processor of the first computer system, and the code snippet comprises software instructions that can be stored in a computer-readable medium. The AES 120 can display the content associated with the advertising code snippet 105 in a web browser application on a virtual machine. In the foregoing fashion, the AES 120 can simulate a user's input action on a virtual machine and can simulate a user's input keystroke or selection (e.g., a mouse click) to execute an advertising code snippet and thus provide a mechanism for automatically displaying and testing the advertising code snippet.

The process 300 monitors processing actions of the executing code snippet (308). The processing actions can be monitored by the first computer system to determine whether the processing actions violate one or more predetermined system policies indicative of a content item unsuitable for presentation. For example, the AES 120 may implement a machine learning engine to monitor the advertising code snippet 105 in some implementations, and may use a rule set to monitor the processing actions in other implementations. Policy information may be stored in a system repository (e.g., repository 210). For example, the AES 120 may monitor a latency associated with the advertising code snippet. Similarly, the AES 120 may monitor the size of a payload received in response to a request issued on behalf of the code snippet 105. In more complex monitoring, the AES 120 may monitor for executions of malware during the execution of an advertising code snippet or during execution of instructions received in response to executing the code snippet. Monitoring can additionally include detecting launching of an application or process, or accessing a restricted or protected memory location of the machine.

The process 300 determines whether the processing actions of the code snippet violate one or more system policies (310). The system policies may be predetermined, according to various implementations, and violation thereof may indicate a content item that is unsuitable for presentation to a user on a user device. If a predetermined threshold number of policy violations are detected during testing of the code snippet, the process 300 may suspend the related digital promotional content or the code snippet (314). For example, the AES 120 may caution or instruct the AMS 104 not to distribute the advertising code snippet 105 or related advertisement to user devices. Alternatively, the system may suspend an advertiser's account, or preclude all third party server requests. Conditions for suspending content can be varied depending on the implementation. For example, in some cases violation of a single policy may be enough to warrant suspending the code snippet or ad. In other cases, violation or one, two, or more system policies may be acceptable, and suspension may be reserved for content that violates a threshold number of policies. Severity of policy violation may also be considered in determining whether to suspend content. If less than the predetermined threshold number of policy violations are detected, the process 300 may validate the digital promotional content item (312), and the content item or code snippet may be approved for distribution to user devices.

In some implementations, the process 300 simulates the execution of an advertising code snippet to determine the behavior of the code snippet. For example, the AES 120 can implement a virtual machine having a "spoofed" Internet Protocol (IP) address—that is, an IP address that is different from the true IP address of the machine—that executes the advertising code snippet. The spoofed IP address can be used to mask the evaluation of the code snippet. In some implementations, the virtual machine can be anonymized for a geographic region relating to a majority of users in the advertising network executing the advertising snippet. For example, if a user device in Russia would be provided different processing actions for an executed advertising code snippet than a user device in the United States, an anonymized IP address for Russia can provide specific information for that advertising code snippet.

Figure 4:
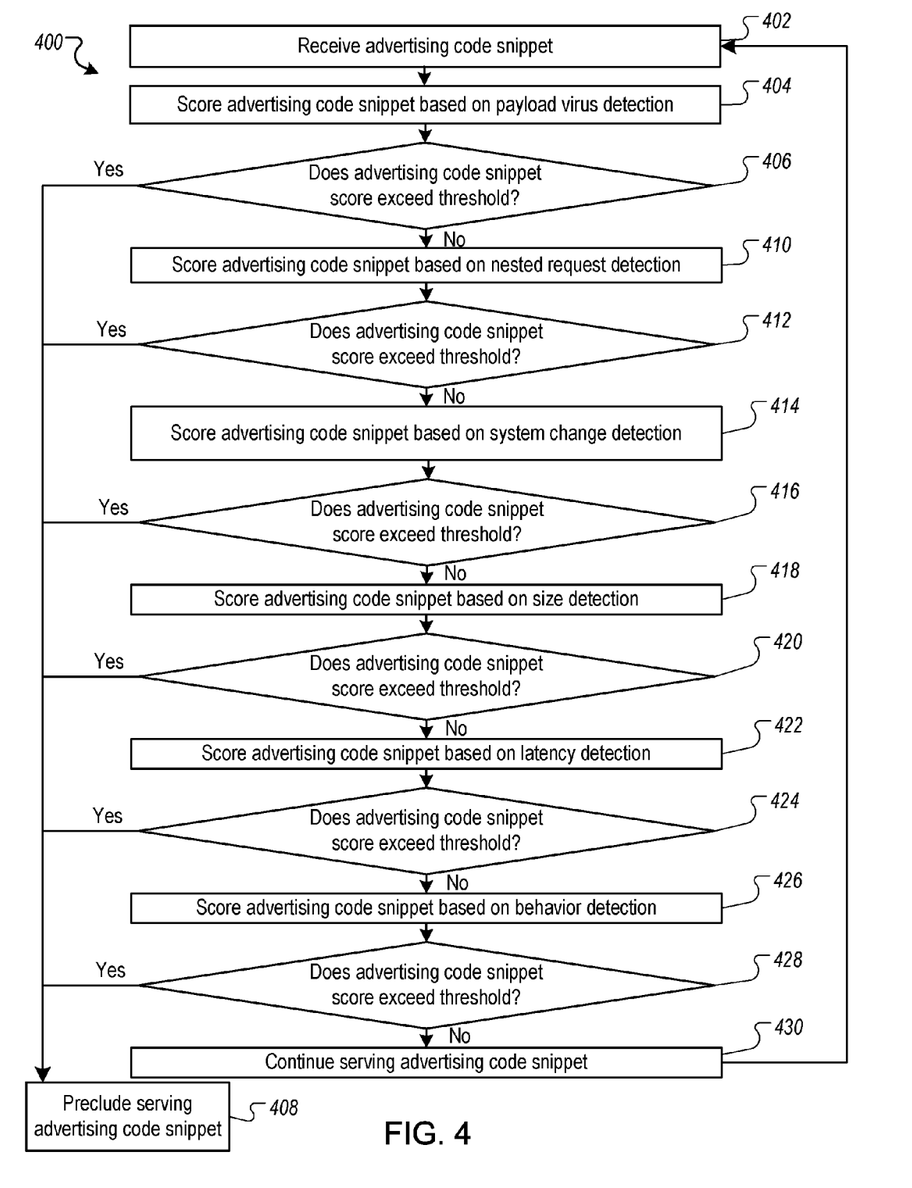
FIG. 4 is a flow diagram of an example process for monitoring various processing actions associated with code snippets.

FIG. 4 is a flow diagram of an example process 400 for monitoring various processing actions associated with advertising code snippets. The process 400 may be implemented using software instructions stored in a computer-readable medium and executed by one or more processors of a computer system or processing system. For example, the AES 120 or AMS 104 may execute the process 400 to test digital content and determine whether the content is appropriate for service to users.

The process 400 starts by receiving an advertising code snippet to be tested (402). For example, the AES 120 can receive one or more advertising code snippets from the AMS 104 or from a content server. The tests may include determining whether or not specific system policies are being followed when the code snippet is executed or following execution of the snippet. For example, the AES 120 can determine whether the advertising code snippets adhere to a particular set of quality thresholds. Various tests may be performed in series or parallel. The discussion that follows will assume for simplicity that individual tests are performed in series, but some or all of the tests can alternatively be performed in parallel in various implementations.

The process 400 scores the advertising code snippet based on detection of viruses on received payloads (404). For example, the AES 120 can monitor payloads received in response to execution of the snippet using virus scanning software. The AES can also scan for other types of harmful content. Virus detections can cause the AES 120 to increment a virus score associated with the advertisement code snippet.

The process 400 determines whether the advertising code snippet's virus score exceeds a threshold (406). If the advertising code snippet's virus score exceeds the threshold, the process 400 may preclude serving of the advertising code snippet (408). For example, the AES 120 can suspend the advertising code snippet for further review. In some implementations, a content provider associated with the code snippet may be identified and assessed a penalty (e.g., a monetary fine) for providing unsuitable content.

With any of the individual tests, the AES 120 can aggregate a violation count of one or more policy violations for the snippet and compare the violation count to a predetermined "violation threshold." In some implementations, thresholds may be determined using weights that can be assigned to individual violations. Weights may be cumulative, so that an overall assessment of whether an advertising code snippet violates a policy may be determined by adding or otherwise combining the weights corresponding to the detected violations. In some implementations, a violation's weight can be included in the sum for each occurrence of the corresponding violation during testing of the advertising code snippet. In other implementations, a violation's weight may be added to the score once, regardless of the number of occurrences of the violation during testing of the advertising code snippet. Other evaluations based on violation weights can also be used. In some cases, scores from two or more tests can be combined to make a decision on content suitability, but the discussion of FIG. 4 will assume for simplicity that results from an individual test are considered in isolation when deciding whether to preclude service of the content.

If the advertising code snippet's virus score does not exceed a threshold, the process 400 scores the advertising code snippet based on nested request detection (410). For example, the advertising code snippet's requested data may be stored on a server that is called by another server that is called by the third-party advertisement server 112, the fourth-party advertisement server 116, or higher-party advertisement servers before the advertising code snippet reaches the AES 120. In some implementations, the more redirection operations that occur in response to the execution of the advertising snippet, the more likely that a policy violation may occur (e.g., malware or latency issues). In some implementations, different policy violations can have different weights assigned based on a severity of the policy violation. For example, one redirection to a site known to have supplied malware can be assigned a higher weight than two redirection operations to presumed-clean servers from the same advertising code snippet. The weights of violations may be adjusted over time as the AES 120 may learn from monitoring processing actions of advertising code snippets, according to some implementations.

The process 400 determines whether the advertising code snippet's nested request score exceeds a threshold (412). If so, the process 400 may preclude serving of the advertising code snippet (408). If the advertising code snippet's nested request score does not exceed the threshold, the process 400 scores the advertising code snippet based on system change detection (414). For example, if the AES 120 determines that the registry of system configuration register values have been unexpectedly changed following execution of the advertising code snippet, the AES may increment a system change score of the advertising code snippet. The process 400 determines whether the advertising code snippet's system change score exceeds a threshold (416). If so, the process 400 may preclude serving of the advertising code snippet (408).

If the advertising code snippet's system change score does not exceed the threshold, the process 400 scores the advertising code snippet based on size detection (418). For example, for ads received in response to a request from an executing snippet, the AES 120 may assign a higher score for larger received ad file sizes. In some implementations, a tiered system based on file types (e.g., text versus audio versus video) can be used, and scoring can be adjusted accordingly. Size violations can cause the AES 120 to increment a violation score associated with the advertisement code snippet. The process 400 determines whether the advertising code snippet's size score exceeds a threshold (420). If so, the process 400 may preclude serving of the advertising code snippet (408).

If the advertising code snippet's size score does not exceed the threshold, the process 400 scores the advertising code snippet based on latency detection (422). For ads received in response to a request from an executing snippet, the AES 120 may assign a higher score for longer latency periods. For example, the third party advertisement server 112 may have a slow connection to the advertising network 110. If a response to a request from the advertising code snippet is slow or delayed in being received, slowing the simulated user device's ability to finish loading a web page, the AES 120 can increment the latency score of the advertising code snippet. The latency score can be determined based on the actual latency period (e.g., 500 milliseconds, 1 second, 5 seconds) or by a percentage of time to load (e.g., 500% longer than a predetermined latency time, perhaps adjusted for file type). Determinations may also be based on user device uploads for a particular geographic area. The process 400 determines whether the advertising code snippet's latency score exceeds a threshold (424). If so, the process 400 may preclude serving of the advertising code snippet (408).

In some implementations, if the advertising code snippet's latency score does not exceed the threshold, the process 400 scores the advertising code snippet based on behavioral change detection (426). For example, the AES 120 can determine if a snippet signature changes from a first instance of executing the advertising code snippet to a second instance of executing the advertising code snippet. This can be determined by, for example, comparing data received from two executions of the advertising code snippet. The comparison may be a direct comparison, or can be a hash of a data collection received. For example, data from a first execution may indicate no redirects, while data from a second execution may indicate one or multiple redirects. Such a change can be indicative of an exploitation attack on a server, such as on a third-party advertisement server 112. Change detections can cause the AES 120 to increment a change score associated with the advertisement code snippet. The process 400 determines whether the advertising code snippet's change score exceeds a threshold (428). If so, the process 400 may preclude serving of the advertising code snippet (408). If the advertising code snippet score does not exceed a threshold, the process 400 continues serving the advertising code snippet (430).

FIGS. 3 and 4 are examples only and are not intended to be restrictive. Other data flows may therefore occur in the environment 100 and, even with the data flows 300 and/or 400, the illustrated events and their particular order in time may vary. Further, the illustrated events may overlap and/or may exist in fewer steps. Moreover, certain events may not be present and additional and/or different events may be included.

Figure 5:
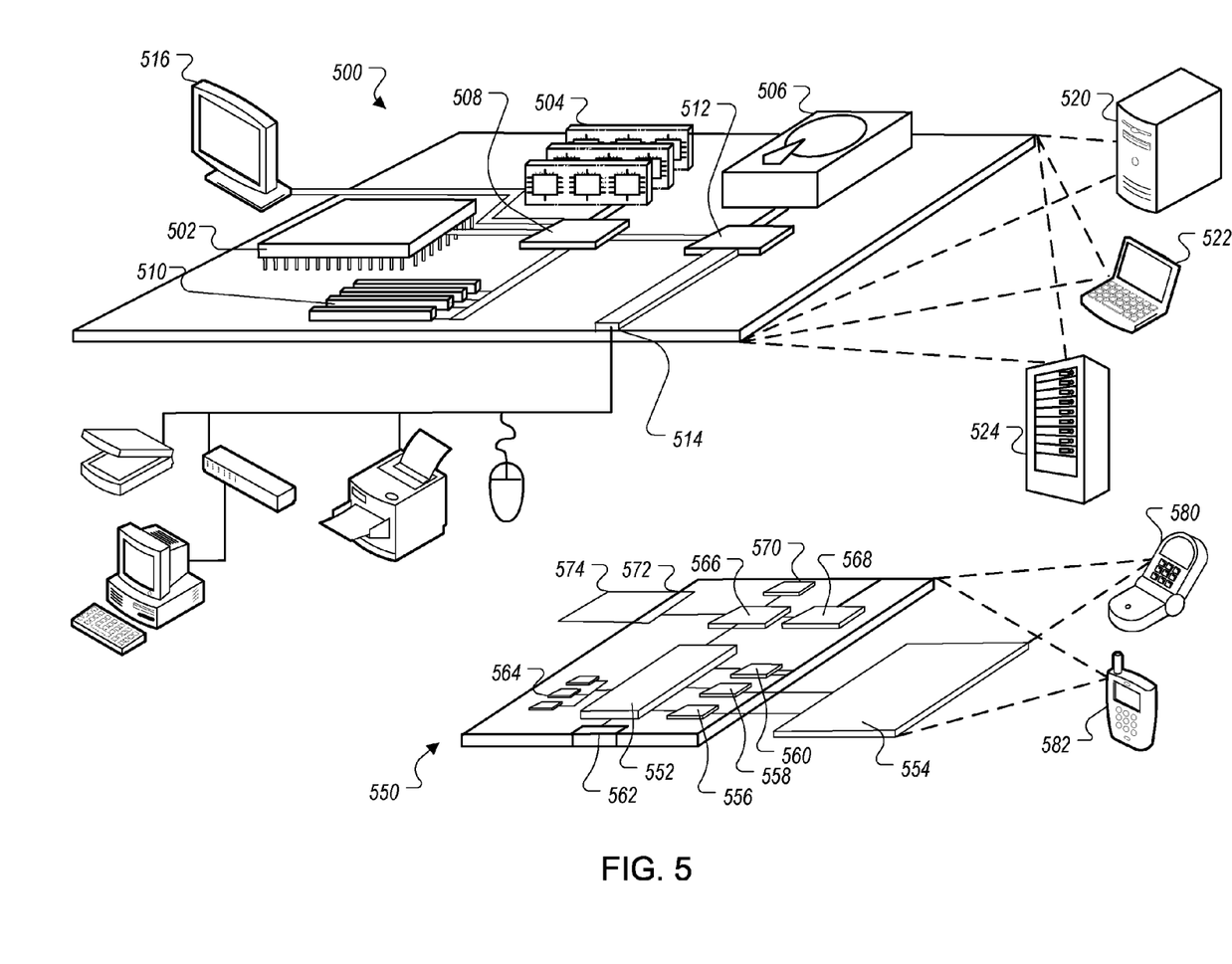
FIG. 5 is a diagram of an example generic computer device and an example generic mobile computer device.

FIG. 5 shows an example of a generic computer device 500 and a generic mobile computer device 550 that may be used to implement the systems and methods described in this document, as either a client or as a server or plurality of servers. The devices or components shown in FIG. 1, for example, may be implemented with one or more of the generic computer device 500 or the generic mobile computer device 550, according to some implementations. Computing device 500 is intended to represent various forms of digital computers, such as laptops, desktops, workstations, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the systems, methods, devices or techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512 are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower-bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by the device 550.

Processor 552 may communicate with a user through control interface 558 and display interface 556 coupled to the display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near-area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may also include secure information. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal.

Device 550 may communicate wirelessly through communication interface 566, which may include digital signal processing circuitry as appropriate. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages or music files) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A computer-implemented method of testing an advertisement for policy violations in a computer system test environment, the method comprising:

receiving, in a first computer system, an advertisement to be tested, the advertisement being available for presentation by the first computer system and hosted by a second computer system different from the first computer system;

simulating, in the first computer system, display of a visual representation of the advertisement, wherein the visual representation is selectable by a user and wherein the advertisement is associated with an executable code snippet;

receiving, in the first computer system, a simulated user click on the visual representation of the advertisement;

executing, in the first computer system, the executable code snippet;

monitoring, in the first computer system, redirection operations and latency associated with the executable code snippet;

in response to monitoring the redirection operations associated with the executable code snippet, calculating a redirection score based on the first computer system requesting first content from a second computer system associated with malware and requesting second content from a third computer system not associated with malware;

in response to monitoring the latency associated with the executable code snippet, calculating a latency score based on an amount that the first computer system slows after executing the executable code snippet;

calculating an overall score for the advertisement based at least in part on the redirection score and the latency score; and validating the advertisement for service to users based on the overall score.

2. The computer-implemented method of claim 1, wherein the executable code snippet is not executed until the advertisement is clicked on.

3. The computer-implemented method of claim 1, wherein the calculating the latency score based on an amount that the first computer system slows after executing the executable code snippet comprises determining an amount of time for the first computer system to load a web page after executing the executable code snippet.

4. The computer-implemented method of claim 3, wherein calculating the latency score based on the amount that the first computer system slows after executing the executable code snippet comprises comparing the amount of time for the first computer system to load a web page after executing the executable code snippet to the amount of time for the first computer system to load the web page before executing the executable code snippet.

5. The computer-implemented method of claim 1, further comprising determining whether a file system configuration of the first computer system is changed, and
   wherein the overall score for the advertisement is based further on determining whether the file system configuration of the first computer system is changed.

6. The computer-implemented method of claim 1, further comprising determining whether an application is launched on the first computer system, and
   wherein the overall score for the advertisement is based further on determining whether the application is launched on the first computer system.

7. The computer-implemented method of claim 1, further comprising determining whether a payload received at the first computer system includes a virus, and
   wherein the overall score for the advertisement is based further on determining whether the payload received at the first computer system includes a virus.

8. The computer-implemented method of claim 1, wherein simulating, in the first computer system, display of a visual representation of the advertisement comprises displaying the visual representation on a display device of the first computer system.

9. The computer-implemented method of claim 1, comprising:
   monitoring, in the first computer system, an execution associated with the executable code snippet by a fourth computer system; and
   calculating, based on the execution associated with the executable code snippet by the fourth computer system, a second redirection score and a second latency score, and
   wherein calculating an overall score for the advertisement is further based on the second redirection score and the second latency score.

10. The computer-implemented method of claim 1, wherein the requesting the first content from the second computer system associated with malware is weighted more than the requesting the second content from the third computer system not associated with malware.

11. A system for testing an advertisement for policy violations, comprising:
   an interface module comprising a processor configured to receive in a first computer system an advertisement to be tested, the advertisement being available for presentation by the computer system and hosted by a second computer system different from the first computer system;
   an interaction module comprising a processor configured to:
      simulate, in the first computer system, display of a visual representation of the advertisement, wherein the visual representation is selectable by a user and wherein the advertisement is associated with an executable code snippet; and
      receive, at the first computer system, a simulated user click on the visual representation of the advertisement; and
      execute, in the first computer system, the executable code snippet;
   a testing module comprising a processor configured to:
      monitor, in the first computer system, redirection operations and latency associated with the executable code snippet,
      in response to monitoring the redirection operations associated with the executable code snippet, calculate a redirection score based on the first computer system requesting first content from a second computer system associated with malware and requesting second content from a third computer system not associated with malware, wherein the requesting the first content from the second computer system associated with malware is weighted more than the requesting the second content from the third computer system not associated with malware;
      in response to monitoring the latency associated with the executable code snippet, calculate a latency score based on an amount that the first computer system slows after executing the executable code snippet; and
      calculate an overall score for the advertisement based at least in part on the redirection score and the latency score; and
   a validation module comprising a processor configured to validate the advertisement for service to users based on the overall score.

12. The system of claim 11, wherein the executable code snippet is not executed until the advertisement is clicked on.

13. The system of claim 11, wherein the testing module configured calculate the latency score based on the amount that the first computer system slows after executing the executable code snippet is further configured to determine an amount of time for the first computer system to load a web page after executing the executable code snippet.

14. The system of claim 13, wherein the testing module configured to calculate the latency score based on the amount that the first computer system slows after executing the executable code snippet is further configured to compare the amount of time for the first computer system to load a web page after executing the executable code snippet to the amount of time for the first computer system to load the web page before executing the executable code snippet.

15. The system of claim 11, wherein the testing module is further configured to determine whether a file system configuration of the first computer system is changed, and
   wherein the overall score for the advertisement is based further on determining whether the file system configuration of the first computer system is changed.

16. The system of claim 11, wherein the testing module is further configured to determine whether an application is launched on the first computer system, and
   wherein the overall score for the advertisement is based further on determining whether the application is launched on the first computer system.

17. The system of claim 11, wherein the testing module is further configured to determine whether a payload received at the first computer system includes a virus, and
   wherein the overall score for the advertisement is based further on determining whether the payload received at the first computer system includes a virus.

18. The system of claim 11, wherein simulating, in the first computer system, display of a visual representation of the advertisement comprises displaying the visual representation on a display device of the first computer system.

* * * * *